United States Patent [19]
McHann, Jr.

[11] Patent Number: 5,983,353
[45] Date of Patent: Nov. 9, 1999

[54] SYSTEM AND METHOD FOR ACTIVATING A DEACTIVATED DEVICE BY STANDARDIZED MESSAGING IN A NETWORK

[75] Inventor: Stanley E. McHann, Jr., Austin, Tex.

[73] Assignee: Dell USA, L.P., Round Rock, Tex.

[21] Appl. No.: 08/784,561

[22] Filed: Jan. 21, 1997

[51] Int. Cl.[6] .............................. G06F 13/38; G06F 1/30
[52] U.S. Cl. .................... 713/310; 713/330; 395/750.06
[58] Field of Search ........................ 340/825.14, 825.34, 340/825.2, 825.07; 395/750.02, 750.05, 200.48, 200.36, 200.05, 750.06; 707/501; 750/1, 3, 6

[56] References Cited

U.S. PATENT DOCUMENTS

| | | | |
|---|---|---|---|
| 4,754,273 | 6/1988 | Okada | 340/825.2 |
| 4,812,839 | 3/1989 | Okada | 340/825.14 |
| 4,896,277 | 1/1990 | Vercellotti et al. | 340/825.06 |
| 5,051,720 | 9/1991 | Kittirutsunetorn | 340/310.02 |
| 5,404,544 | 4/1995 | Crayford | 395/750.02 |
| 5,471,617 | 11/1995 | Farrand et al. | 709/100 |
| 5,537,099 | 7/1996 | Liang | 340/825.07 |
| 5,652,893 | 7/1997 | Ben-Meir et al. | 713/310 |
| 5,742,833 | 4/1998 | Dea | 395/750.05 |
| 5,774,669 | 6/1998 | George et al. | 709/224 |
| 5,787,252 | 7/1998 | Schettler et al. | 709/224 |
| 5,790,793 | 8/1998 | Higley | 395/200.48 |
| 5,802,146 | 9/1998 | Dulman | 379/34 |

*Primary Examiner*—Frank J. Asta
*Assistant Examiner*—Khanh Quang Dinh
*Attorney, Agent, or Firm*—Skjerven, Morrill, MacPherson, Franklin & Friel LLp; Ken J. Koestner

[57] ABSTRACT

A device connected to a network operates in a plurality of states including an execution state and a low-power state. During operation in the low-power state, the device is activated to an execution state in response to standard messages such as Ethernet messages. A receiving device connected to a network is activated from a suspended or low-power state by the receipt of a message from a sending device. The message necessarily includes a unique Ethernet address identifying the destination device in accordance with a standard specification, such as the IEEE 802.3 specification. The receiving device reads the unique Ethernet address of the message, determines a type classification of the message content, and determines whether to become activate or remain in the low-power state on the basis of the Ethernet address and the message type.

30 Claims, 10 Drawing Sheets

FIG. 6 Key

| FIG. 6A |
| FIG. 6B |

SYSTEM AND METHOD FOR ACTIVATING A DEACTIVATED DEVICE BY STANDARDIZED MESSAGING IN A NETWORK

BACKGROUND OF THE INVENTION

1. Field of the Invention

The present invention relates to network management systems. More specifically, the present invention relates to a system and method operating in a network for activating devices from a suspended or inactive state.

2. Description of the Related Art

Various networks have been developed to support the rapid transport of information between multiple users. A generic wide area network (WAN) was developed to supply connectivity among computer and computer-related sources and destinations that are widely dispersed geographically. WAN interconnections have been developed generally from telephone network facilities and include enterprise and subscription networks including Tymnet, Telenet and ARPANET. A generic local area network (LAN) was developed to support the networking of personal computers in an enterprise environment. A popular LAN access protocol is the Ethernet protocol.

The devices connected to a network, including computers and computer-related systems, typically are not in use continuously, although the devices are constantly connected to the network. To conserve power consumption and reduce equipment and maintenance costs, devices that are not in use are advantageously deactivated. However, messages directed to a device may be issued at any time. What is needed is a system and operating method for activating a network device when a request is pending and to deactivate the device when requested operations are complete. What is further needed is an automatic system and operating method for activating and deactivating a network device, as needed, without operator intervention.

One such automatic system for activating and deactivating a network device is a Token Ring Card supplied by IBM. The Token Ring Card is configured for connection to a motherboard of a host computer and includes a power supply for powering the Token Ring Card while power is removed from the host computer. The Token Ring Card includes a Wake-on-LAN feature for sending an activating signal to the host computer. The Token Ring Card further includes a circuit for terminating operating power to the host computer under defined conditions. When the Token Ring Card detects a message, the a Wake-on-LAN functionality causes a signal to be sent to the host computer applying power to the host computer back plane and activating the computer to respond to the request.

One problem with the Token Ring Card is that the signals that are applied by the Token Ring Card to the host computer and capable of activating the Token Ring Card are proprietary and nonstandard.

What is needed is a system and operating method for controlling the activation and deactivation of all types of devices connected to a network by standardized techniques.

SUMMARY OF THE INVENTION

In accordance with an embodiment of the present invention, a device connected to a network operates in a plurality of states including an execution state and a low-power state. During operation in the low-power state, the device is activated to an execution state in response to standard network messages such as Ethernet messages.

In accordance with an embodiment of the present invention, a receiving device connected to a network is activated from a suspended or low-power state by the receipt of a message from a sending device. The message necessarily includes a unique Ethernet address identifying the destination device in accordance with the IEEE 802.3 specification. The receiving device reads the unique identifier of the device, such as an Ethernet address, a Token Ring address, ATM identifier, or other unique identifier for other network technologies that specify a requirement of a unique identifier. The receiving device identifies the message type, then makes a decision whether to change states. For example, an Ethernet broadcast message to multiple devices on the network may be service or may be ignored with the device left in a low power state.

In accordance with an embodiment of the present invention, a receiving device is connected to a network by a powered network interface, thereby supporting the physical interface between the network and the receiving device while other elements of the receiving device are denied power. In the resulting low-power state, the receiving device is nonoperational but subject to activation through operations of the powered network interface. A message from a sending device on the network has the potential to activate the receiving device. The message requires a unique Ethernet address identifying the destination device in compliance with the IEEE 802.3 specification. In response to the message, the network interface connected to the receiving device includes a controller that accesses the destination device identifier from the message, classifies the message according to message type, and determines whether to activate the destination device or leave the destination device in the low-power state based on a set of activation rules relating to the destination device identifier and the message type. The activation rules are predetermined in some embodiments and set by a network user in other embodiments. New power interface standards assign control of the network interface to the network interface driver residing within the receiving device. No special power connections are necessary since the bus in the device supplies power to the network interface.

Many advantages are achieved by the described system and operating method. A capability to activate a device, such as a computer, remotely from a network interconnection is highly advantageous, allowing a network administrator to activate a remote device in a low power, inactive state without having to physically operate a switch. Flexible message communications and powerfill system control operations are advantageously achieved in an interface that may be implemented fully in software so that extra hardware including an extra power supply and network interface components.

It is advantageous that the system prevents unauthorized access to a device. Another advantage is that the described system facilitates operations throughout a network at various device levels from low-level and hardware level operations to system and applications software operations. It is advantageous that the described system and operating method may be implemented in a simple application-dependent integrated circuit (ASIC) so that all network monitoring, control and management operations are performed on a hardware device. A further advantage is that the described network monitoring, control and management system is flexibly applicable to multiple network protocols such as ATM, Token Ring, Ethernet, Frame Relay and the like.

It is advantageous that the described system and operating method validates two aspects of authentication in parallel, including validation of the workstation originating the message and validation of the user attempting to access the receiving device. The parallel authentication procedure is advantageous for improving device security without obligating a network administrator to track and administer security profiles. The security features of a network interface controller are advantageously facilitated and augmented by the security mechanisms of the Windows operating systems so that a small amount of applications code achieves a substantial functionality by exploiting features of the installed operating system and drivers.

The described activation system and operating method advantageously quickly checks credentials of a user and rapidly allows access to a network device to an authorized user while quickly denying access to a user that is not authorized for access to a device.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

DESCRIPTION OF THE ILLUSTRATIVE EMBODIMENT(S)

Figure 1:
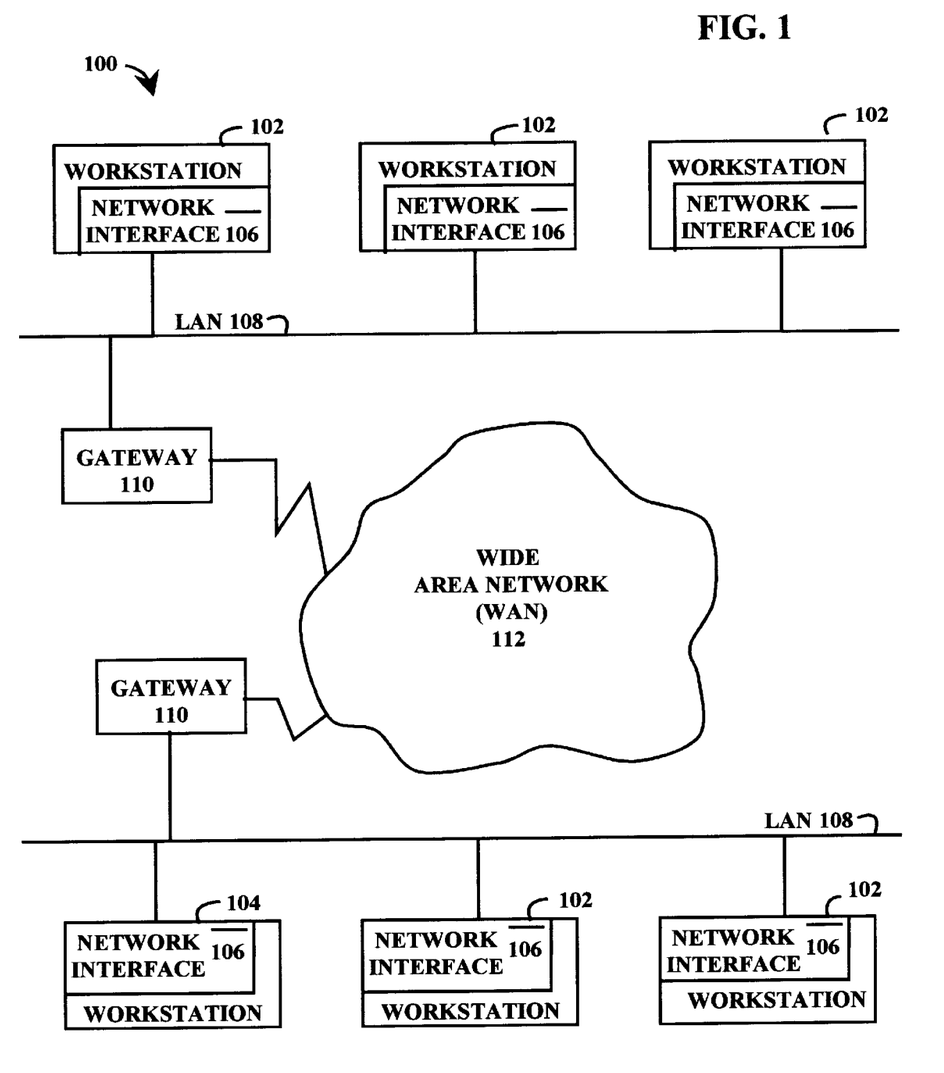
FIG. 1 is a schematic block diagram illustrates a network connected to a plurality of devices in accordance with an embodiment of the present invention.

Referring to FIG. 1, a schematic block diagram illustrates a network 100, including a plurality of local area networks (LAN) 108 and a wide area network (WAN) 112, connected to a plurality of devices 102. The local area networks 108 are connected to the wide area network 112 at a gateway 110. A gateway 110 has a LAN interface and a WAN interface. Various types of devices 102 include computers, personal computers, workstations, smart terminals and other types of devices that are suitable for connection to a network. The devices 102 are connected to a local area network 108 by a network interface 106, which is typically included within a device 102.

In the illustrative example, one of the devices is a receiving device 104 which is connected to the network 100 by a network interface 106. In one operational mode, operating power is removed from the receiving device 104 while the network interface 106 is powered so that the receiving device 104 is nonoperational for security purposes and power savings but still supporting the physical interface and remaining accessible on the network 100. In the low-power state, the receiving device 104 is nonoperational but sufficiently active to receive data frames and packets from the network 100 through operations of the powered network interface 106.

A message from a sending device on the network 100 potentially activates the receiving device 104. A device user or network administrator determines the conditions or rules for activating the receiving device 104. One aspect of the conditions or rules is that the message include a correct Ethernet address identifying the receiving device 104. To comply with the IEEE 802.3 specification, each message transmitted on the network 100 requires a unique Ethernet address identifying the destination device for receiving the message.

The network interface 106 monitors messages conveyed on the network 100 to detect message packets and frames that (1) include an Ethernet address that matches the address of the receiving device 104 and (2) comply with the conditions or rules set by the device user or network administrator. Upon accessing the message, the network interface 106 accesses the destination device identifier from the message, classifies the message according to message type, and determines whether to activate the receiving device 104 or leave the receiving device 104 in the low-power state.

If the network interface 106 determines that a received message is suitable with respect to the defined conditions and rules, the network interface 106 supplies operating power to the receiving device 104 so that the receiving device 104 is activated to process the request contained in the received message. The receiving device 104 processes the request. When processing of the request is complete, the receiving device 104 activates a control procedure in the network interface 106 for returning the receiving device 104 to the low-power, nonoperational state while the network interface 106 remains active awaiting subsequent messages.

The operation of the network interface 106 is analogous to a "caller ID" technique applied to networks. The identifier of the caller ID is a unique network identifier that is assigned specifically to a particular network interface. Although the illustrative example shows a unique network identifier that is defined according to the Ethernet standard, other network protocols, including Token Ring, ATM and others also have a unique network identifier that is required by respective standard definitions. In further embodiments, the identifier is protocol independent so that the network interface 106 reads a frame type out of the message header and presume that the message is consistent with a standard configuration such as internet packet (IP), internet packet exchange (IPX), netbios, and the like.

Figure 2:
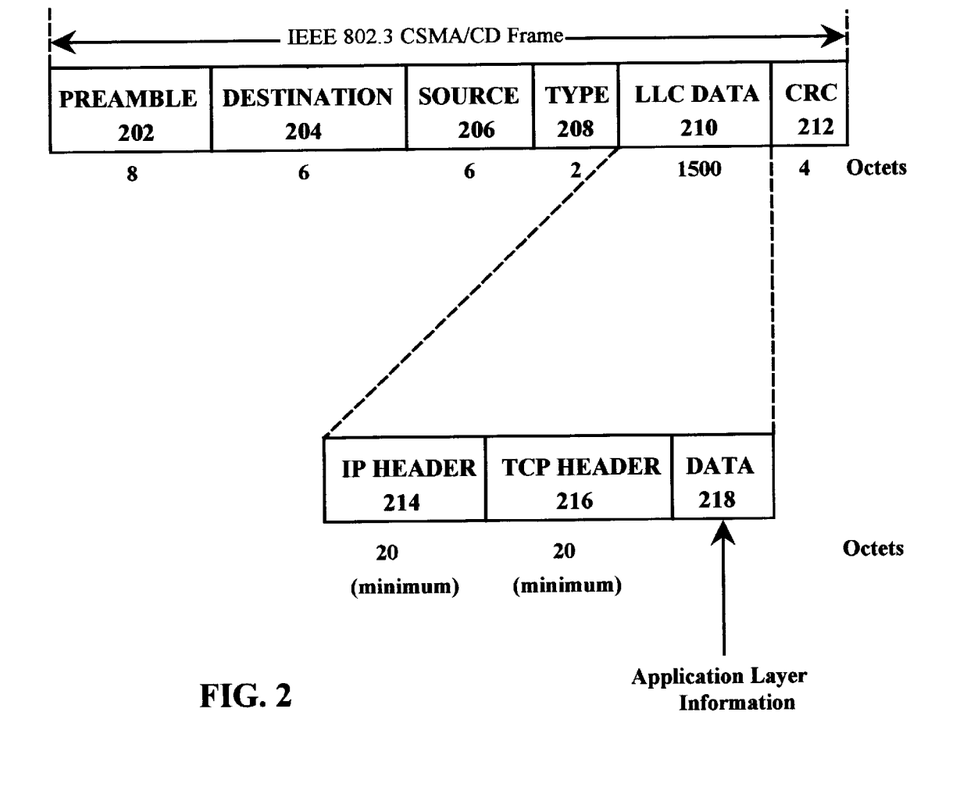
FIG. 2 is a schematic tabular view showing a typical IEEE 802 frame with LLC (logical link control) and TCP (transmission control protocol) functions.

Referring to FIG. 2, a schematic tabular view of a typical IEEE 802 frame with LLC (logical link control) and TCP (transmission control protocol) functions is shown. The frame 200 includes a preamble field 202, a destination address field 204, a source field 206, a type field 208, a logical link control (LLC) data field 210, and a cyclic redundancy check character (CRC) 212. The LLC data field 210 includes a Internet Protocol (IP) header 214, a transmission control protocol (TCP) header 216, and an application layer information data field 218. The destination address field 204 is used by a transmitting device and the receiving device 104 to determine whether a message is to be accepted by the receiving device 104.

Figure 3:
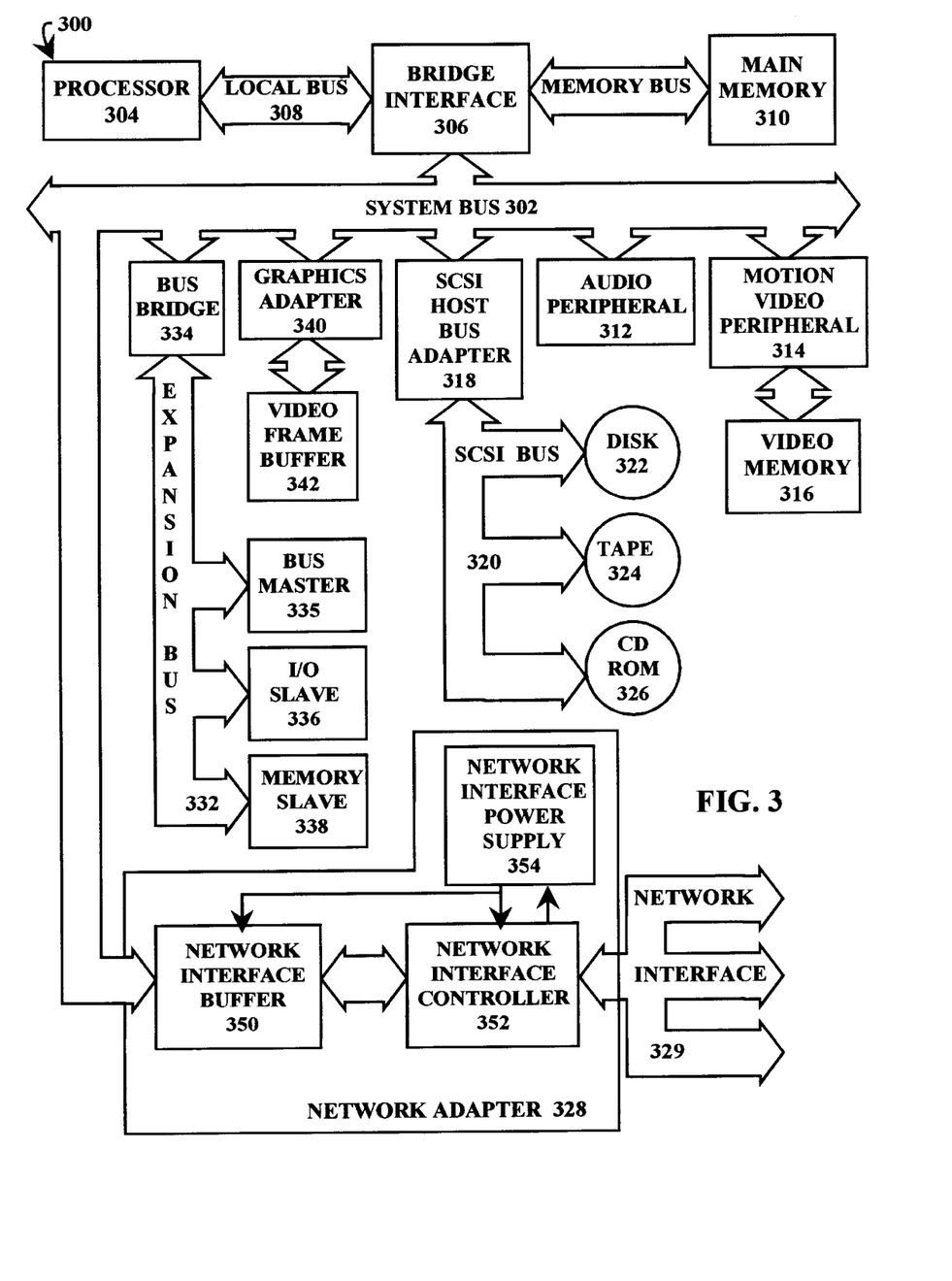
FIG. 3 is a schematic block diagram illustrating an embodiment of a device computer for implementing a system and method for activating devices in a network from a suspended state.

Referring to FIG. 3, a schematic block diagram illustrates an embodiment of a device computer 300 for implementing a system and method for activating devices in a network from a suspended state. The device computer 300 includes a system bus 302 for communicating among several devices. A suitable system bus 302 is a Peripheral Component Interconnect (PCI) bus although other bus systems may alternatively be used. A processor 304 is connected to the system bus 302 through a bridge interface 306, which has a direct connection to the processor 304 via a local bus 308. The bridge interface 306 includes interfacing logic and a cache memory. A main memory 310 supplies storage for data structures and program code for execution by the processor 304 and communicates with the processor 304 via the bridge interface 306 with the cache memory internal to the bridge interface 306 providing caching between the processor 304 and the main memory 310.

Various combinations of devices may be connected to the system bus 302 for interaction with the processor 304. In the illustrative embodiment, devices connected to the system bus 302 include an audio peripheral 312 and a motion video peripheral 314. The motion video peripheral 314 is further connected to a video memory 316.

In the illustrative embodiment, a Small Computer Systems Interface (SCSI) host bus adapter 318 is included to connect the system bus 302 to a SCSI bus 320. The SCSI bus 320 is supplied for connection to devices such as-storage devices including a disk storage 322, a tape storage 324, and a CD ROM storage 326. In other embodiments, various alternative interfaces may be substituted for the SCSI bus 320 such as an Enhanced Small Disk Interface (ESDI) or Intelligent Drive Electronics (IDE).

To supply a networking functionality, a network adapter 328 of a network interface 329 is connected to the system bus 302 for connecting the illustrative device computer 300 to a network 330 such as a local area network (LAN), wide area network (WAN), internet, intranet, or the like. The network adapter 328 includes a network interface buffer 350, a network interface controller 352, and a controlled network interface power supply 354. The network interface buffer 350 is used for temporarily storing messages received from the network 330. In one embodiment, the network interface controller 352 is implemented as an application specific integrated circuit (ASIC). In one embodiment, the network interface controller 352 is compliant with an ACPI power control system which is designed and manufactured by Microsoft of Redmond, Wa. In other embodiments, a device driver for the network interface manages power in a network device in a manner similar to the ACPI power control system.

The network interface power supply 354 is connected to the network interface controller 352 and supplies power to the network interface 329 independently from the supply to the device computer 300. The network interface power supply 354 advantageously supplies power in the order of milliwatts to the network interface 329 so that the network interface 329 is active whether the remainder of the device computer 300 is active or inactive. The network interface power supply 354 advantageously enables the network interface 329 to monitor messages even when power to the device computer 300 is terminated. The network interface controller 352 implements a control algorithm for controlling access to the device computer 300, operating as the receiving device 104 shown in FIG. 1. The network interface controller 352 is encoded with a network identifier address that uniquely identifies the receiving device 104 and distinguishes the receiving device 104 from any other device. The network identifier address identifies the receiving device 104 according to the IEEE 802.3 specification and supplies a unique designation of the receiving device 104 for multiple network communication protocols including ARPANET, Ethernet, Token Ring, ATM and the like. Accordingly, every receiving device including computers, desktops, laptops, workstations and the like have a unique, defined destination address.

The system bus 302 is connected to an expansion bus 332 by a bus bridge 334. In one example of a device computer 300, the expansion bus 332 is an Industry Standard Architecture (ISA) bus and the bus bridge 334 is a serial input/output (SIO) PCI/ISA bridge. In other embodiments, an expansion bus 332 may be omitted or replaced by other known buses including EISA, microchannel, or other bus. The expansion bus 332 is typically used to connect additional devices to the device computer 300. In the illustrative example, a bus master 335 and several slave devices such as an input/output slave 336 and a memory slave 338 are connected to the expansion bus 332.

A graphics adapter 340 is connected to the system bus 302 for supplying graphics capabilities to the device computer 300. The graphics adapter 340 is connected to a video frame buffer 342.

In the illustrative device computer 300, messages are generated and consumed by a wide variety of subsystems performed a wide array of functions including sound processing and performance, video conferencing, high end graphics, high-speed networking, and many other applications including highly complex analysis and control applications.

The various subsystems within the device computer 300 perform multiple different functions and generate messages that are communicated among subsystems in the device computer 300. This transmission of messages is used to control the system using a network management protocol. In an illustrative embodiment, a Simple Network Management Protocol (SNMP) is used to control subsystems in the device computer 300.

Figure 4:
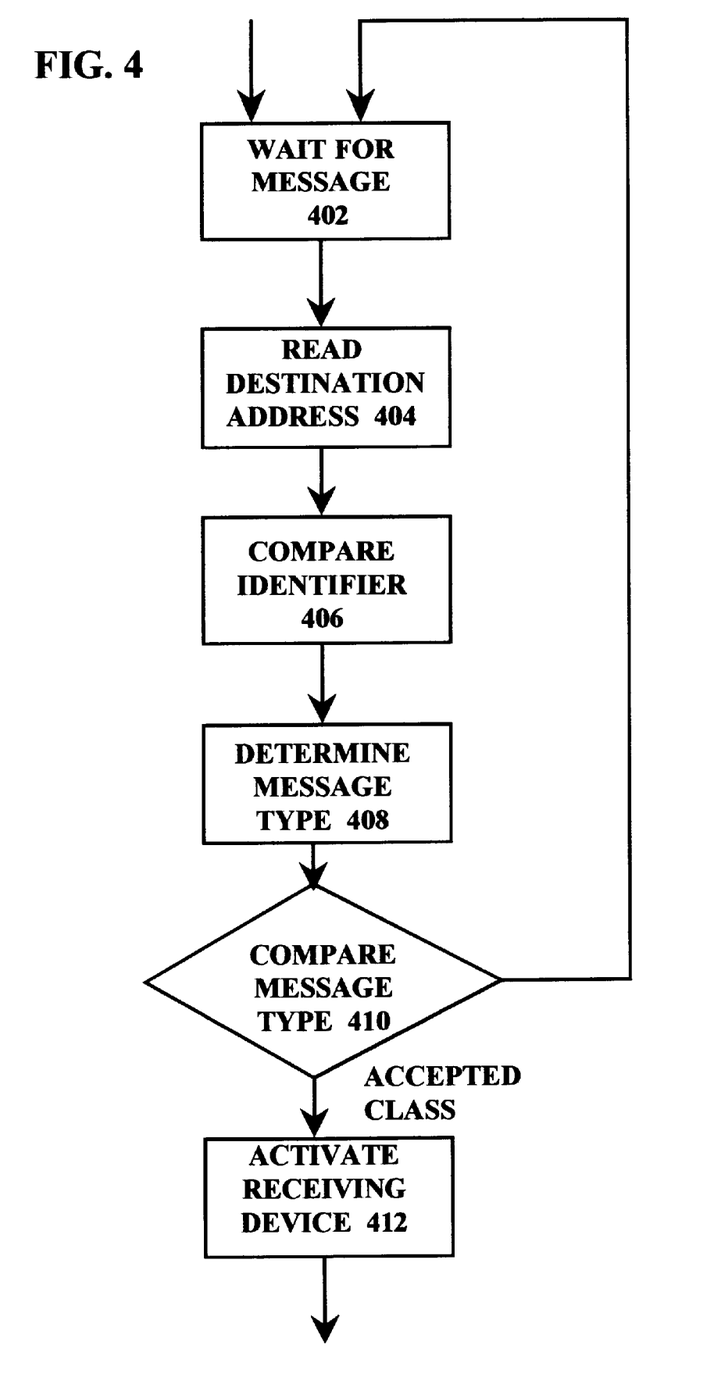
FIG. 4 is a flowchart illustrating operations performed by a controller to manage access to a receiving device.

Referring to FIG. 4, a flowchart illustrates operations performed by an embodiment of a controller such as the network interface controller 352 to manage access to a receiving device 104. In a Wait for Message step 402, the controller monitors traffic on the network. Every message on the network includes the designation of a network identifier address. In Read Destination Address step 404, the controller reads the network identifier address for a message communicated by the network. The controller compares the received network identifier address to the identifier of the receiving device in Compare identifier step 406. If the network identifier address does not match the identifier of the receiving device, the controller returns to the Wait for Message step 402. Otherwise, the controller advances to a Determine Message Type step 408.

The Determine Message Type step 408 determines the type of message that is received. The various network protocols define several message types. For example, an Ethernet Token Ring defines message types including packet types such as broadcast packets (transmitted to all destinations), multicast packets (transmitted to selected multiple destinations), and IPX packets. The controller is previous configured to accept certain types of messages and to deny access to other message types. For example, the controller may be configured to accept messages that are intended solely for the receiving device but to deny access to messages that are intended for multiple devices, such as multicast messages and broadcast messages. In a Compare Message Type step 410, the controller determines whether the message type is within an accepted class. If the message is not in an accepted class, the controller returns to the Wait for Message step 402. Otherwise, the controller advances to an Activate Receiving Device step 412. In the Activate Receiving Device step 412, the controller applies operating power to the device, activating a processor within the device and activating peripherals connected to the processor including hard disk drives and the like.

The illustrative method for managing access to a receiving device allows access to the receiving device via a transmitting device that formulates a message that includes the correct network identifier address of the receiving device and a message of a type that is allowed access by the receiving device.

In one example, an application program such as an applet, an executable program executing on the transmitting device intended to browse a network to access one or more receiving devices, is activated to allow access to a particular receiving device. The exemplary applet is executed, for example, after hours by a system administrator to perform maintenance or system updates on multiple inactive devices in a network. The receiving devices are configured to permit access to the messages transmitted by the system administrator. The system administrator activates a desired operation, the multiple receiving devices are activated, and the multiple receiving devices respond by accepting the messages and executing operations requested by the messages. When execution of the operations is complete, the receiving devices return to the inactive state and continue to monitor the network for subsequent messages.

In a second example, a receiving device is configured to receive incoming mail traffic from the Internet. Transmitting devices directing messages to the receiving device acquire the network identifier address through advertising, Internet directories and the like. The controller of a receiving device allows access to messages including the correct network identifier address and having a defined allowable message type. The controller of the receiving device receives a suitable message, performs requested interactions, and returns the receiving device to an inactive, low-power state upon completion of the interactions.

One advantage of the illustrative message control system and operating method is that messages are formulated at the applications software level, transmitted to a receiving device, and operational in the receiving device at low system levels, including the level of drivers and hardware interfaces. Accordingly, the illustrative message control system and operating method supplies a formal technique for controlling devices across a network at a variety of system levels using high-level system messaging techniques. The packets are advantageously accepted or rejected by a receiving device completely through software control so that special hard-wired lines between devices in the network or system are not necessary.

Figure 5:
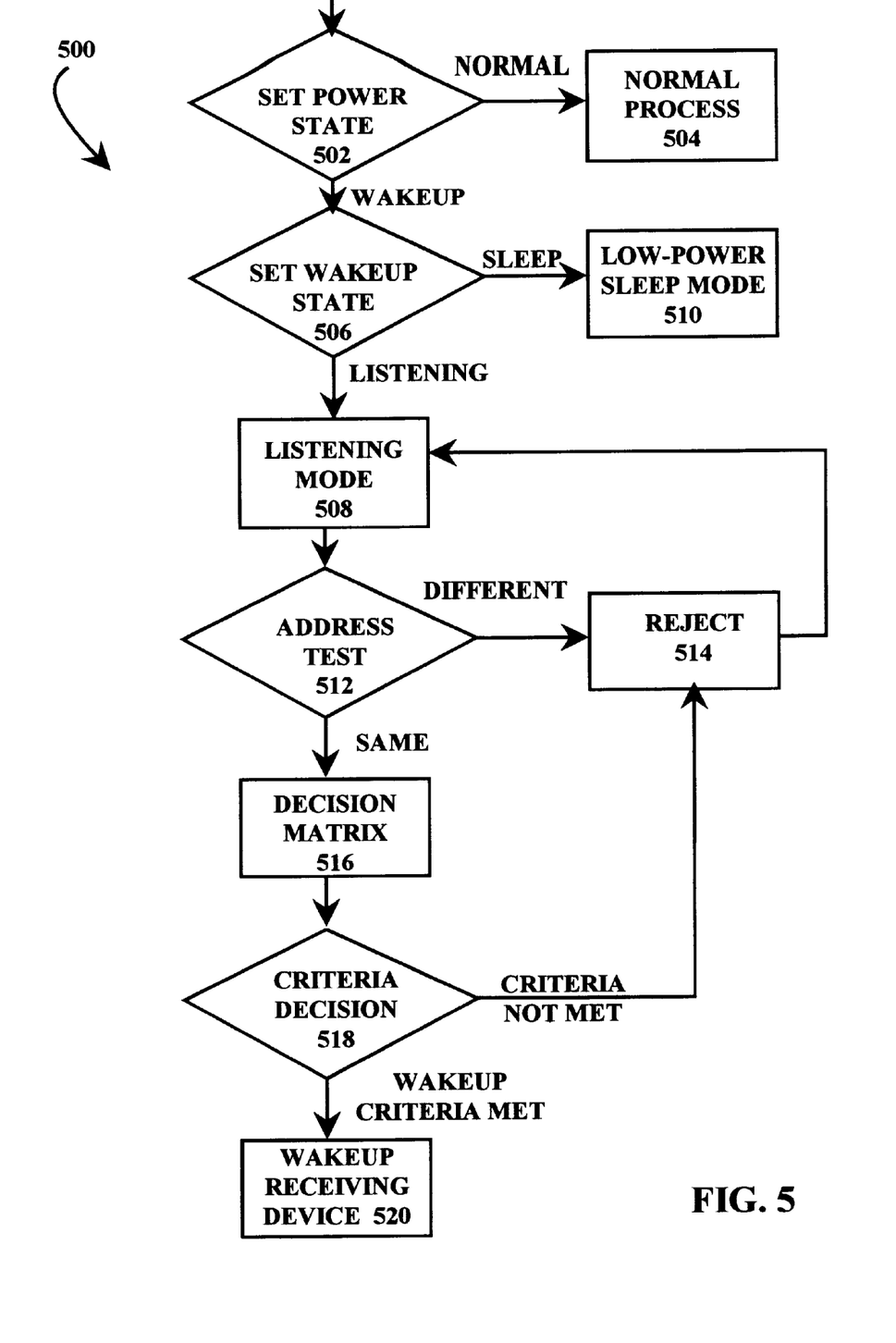
FIG. 5 is a flowchart depicting an embodiment of a method for controlling access to a receiving device.

Referring to FIG. 5, a flowchart depicts an embodiment of a method for controlling access to a receiving device. The illustrative method is typically implemented as a control routine in software or control circuit in hardware circuitry for a network interface connecting the receiving device to the network. The first step in the access control method 500 sets the power state 502 based on whether the system is activated or deactivated into a "virtual off" state or a low power state. If the system is activated, the system executes predetermined operations in a normal process operating mode 504. Otherwise, the system sets the wakeup state 506 based on whether the system is enabled for a listening mode or the listening mode is disabled so that the system enters a sleep mode.

If the system is enabled for the listening mode 508, operating power to the network interface is applied but operating power to the receiving device in general is withheld. In this state the total power in the receiving node, including the network interface controller, is a low sleep-like state with only a sufficient amount of operating power applied to listen to the network and to reject nonspecified messages. In the listening mode 508, the network interface waits for the receipt of a message in a network interface buffer. During the listening mode 508, the network interface reads all messages that are transmitted on the network. For each received message, the network interface tests the network identifier address contained in the message in comparison to the network address associated with the network interface in an Address Test step 512. The listening mode 508 allows the receiving device to enter a low power mode but to awaken upon occurrence of a predefined event.

If the listening mode is disabled, the system is deactivated and functions in a low-power sleep mode 510 with power in both the receiving device and the network interface withheld. In the low-power sleep mode 510, the network interface controller is disabled so that all message packets are rejected.

In the Address Test step 512, the network interface controller determines whether the network identifier address transmitted in the received message is the same as the address associated with the network interface. If the addresses are not equivalent, the received message frame is not addressed to the receiving device and the network interface controller enters a Reject state 514. In the Reject state 514, the network interface controller ignores the message and returns to the listening mode 508 and continues to monitoring incoming messages. When an incoming message encodes the same network identifier address as the network interface address, the network interface controller begins a Decision Matrix processing step 516.

In the Decision Matrix processing step 516, a plurality of previously configured parameters are tested to determine whether the receiving device is to be activated. The parameters include various conditions such as message type, frame type, the source address of the transmitting device, message time and date, and the like. A user or system administrator previously selects the conditions for activating the receiving device and the network interface controller processes the conditions using a decision matrix. In the Decision Matrix processing step 516, the network interface controller tests each parameter that is designated as pertinent by the user or system administrator. Furthermore, the network interface controller tests each pertinent parameter with respect to designated suitable values that are defined by the user or system administrator. For example, the network interface controller checks the message type by analyzing the 48-byte header of the message and determining the message type to be an Ethernet, Token Ring, or other message type. The network interface controller typically checks the message type to determine whether the message is a multicast frame, a broadcast frame.

The decision matrix allows the message to be analyzed for a designated source so that the user or system administrator may allow access to the receiving device for only a particular transmitting device or class of transmitting devices.

The decision matrix allows messages to be accepted only during certain operating hours. For example, a short time window may be designated to allow a system administrator to perform maintenance or other operations at a designated time.

The decision matrix advantageously allows the network interface controller to perform advanced control operations to specifically designate the conditions for activating a receiving device based on a wide range of different criteria.

If the received message satisfies all criteria designated by the decision matrix, a Meets Criteria Decision step 518 directs the network interface controller to a Wakeup Receiving Device step 520. Alternatively, all criteria are not met and the Criteria Decision step 518 directs the network interface controller to the Reject state 514 and to the listening mode 508. A capability to activate a device, such as a computer, remotely from a network interconnection is highly advantageous, allowing a network administrator to activate a remote device without having to physically operate a switch.

Figures 6, 6B:
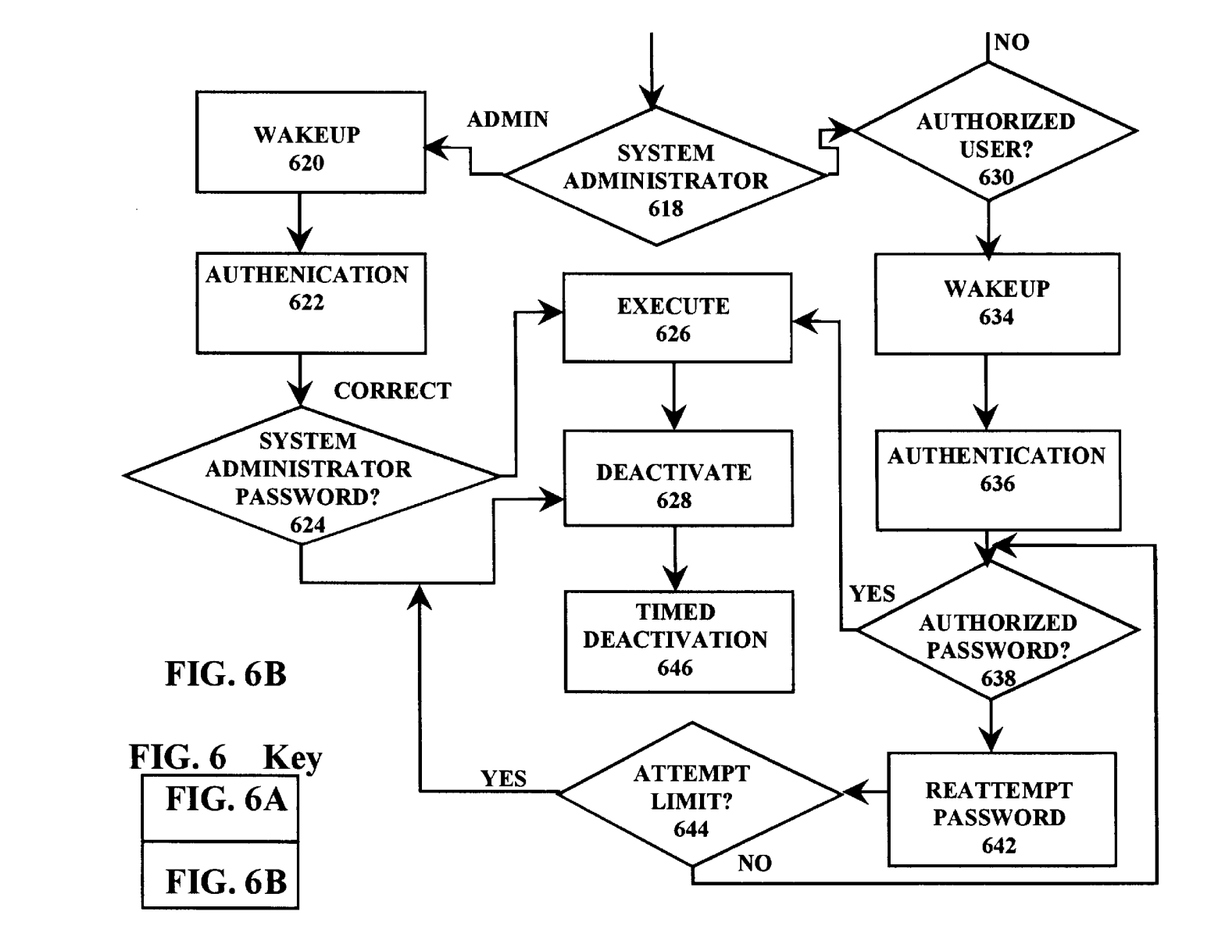
FIG. 6, 6A, and 6B are flowcharts illustrate a decision process for determining whether a receiving device is to be activated based on a plurality of predetermined criteria.
Figure 6A:
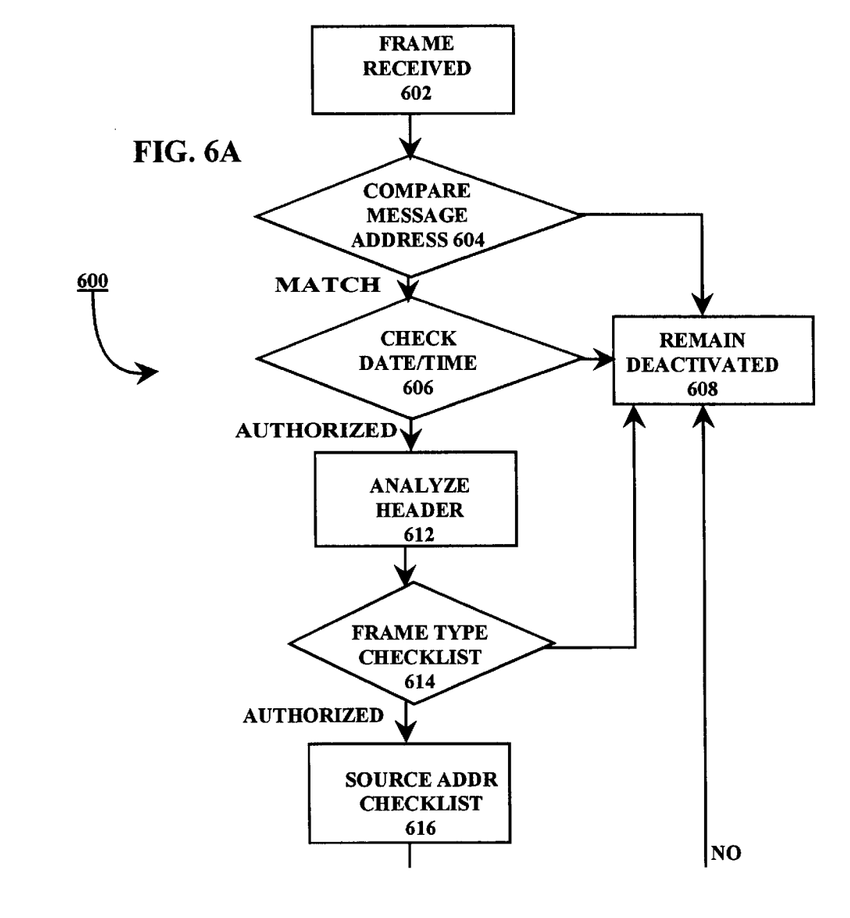

Referring to FIG. 6, 6A and 6B, a flowchart illustrate a decision process 600 for determining whether a receiving device is to be activated based on a plurality of predetermined criteria. The decision process 600 begins with the receipt of a frame in a frame received step 602. Once the frame is received, the decision process 600 continues with a series of check operations for checking various preselected parameters. The series of check operations operates as a quick reject procedure for quickly rejecting an incoming message based on a hierarchy of criteria. Once a message is rejected, the decision process 600 quickly returns to a monitoring state for analysis of subsequent messages. The frame is first analyzed with respect to the address header of the message in a Compare Message Address to Receiving Device Address step 604. If the address appended to the received message is the same as the address of the receiving device, the decision process 600 continues analysis by checking the data and time to determine whether the receiving device is enabled for receiving messages at the current time in a Check Date and Time step 606. Otherwise, the decision process 600 is terminated with a Remain Deactivated step 608 that returns the receiving device to a listening state for monitoring subsequent messages.

The time and data are then analyzed to determine whether the receiving device is currently receiving any messages in a Check Date and Time step 606. If the current date and time is previously designated as a suitable date and time for receiving messages by a user or system administrator, the decision process 600 continues analysis by analyzing the address header in an Analyze Address Header step 612. Otherwise, the decision process 600 is terminated with the Remain Deactivated step 608 that returns the receiving device to a listening state for monitoring subsequent messages.

The decision process 600 includes analysis of a frame type and source address in parallel in the Analyze Address Header step 612. The Analyze Address Header step 612 advantageously validates two aspects of authentication in parallel including a validation of the workstation originating the message and a validation of the user attempting to access the receiving device. The parallel authentication procedure is advantageous for improving device security without obligating a network administrator to track and administer security profiles. In a Frame Type Check List step 614, the decision process 600 analyzes the frame type to determine whether the frame type in the message is previously entered on a defined check list of frame types by the user or a system administrator. An authorized frame type selectively is chosen from a plurality of possible parameters including network identification (ID), Internet Protocol (IP) address, and a valid network ID, for example. If the frame type of the message is not designated as a suitable frame type for processing, the decision process 600 is terminated with the Remain Deactivated step 608 that returns the receiving device to a listening state for monitoring subsequent messages. Otherwise, the decision process 600 continues with a Source Address Check List step 616.

In a Source Address Check List step 616, the decision process 600 analyzes the source address to determine whether the source address designated in the address header of the message is previously entered on a defined check list of addresses. In the illustrative embodiment, the receiving device first determines whether the source address is the address of the system administrator in Check for System Administrator Address step 618. If the source address is the address of the system administrator, then the decision process 600 enters a Wakeup state 620. If the source address is not the address of the system administrator, then the decision process 600 enters a Check for Authorized User step 630.

The Wakeup state 620 includes both a hardware wakeup operation and a software wakeup operation. The hardware wakeup involves application of operating power to the receiving device hardware including activation of a hard disk drive and other peripherals, thereby preparing software for execution. The software wakeup activates the operating system executing on the receiving device hardware. Activation of the operating system kernel progresses to an Authentication step 622 in which the operating system kernel prompts for a password. A password conveyed via the network is then compared to the password for the system administrator in Compare System Administrator Password step 624. If the system administrator password is correct, the system is ready to execute and enters Execute state 626. If the system administrator password is not correct, the decision process 600 progresses to a Deactivate step 628. In the Deactivate step 628, the receiving device reverts to the deactivated state of a sleep mode.

In the Check for Authorized User step 630, the receiving device determines whether other users besides the system administrator are allowed access to the receiving device and, if so, whether the address of the current message is an authorized address. The security mechanism that is implemented by the decision process 600 is an extension of the operating system security. Operating systems including Unix, Windows NT, Windows 95, and others support security features, typically through application programming interfaces (APIs) that extend beyond the features of the operating system. For example, the system may be configured to allow only those messages that are transmitted by the system administrator so that the system administrator address is the only address in the source address checklist. Alternatively, the source address checklist may also include the address of the user's home system, for example. In other cases, multiple user addresses may be authorized. In the Check for Authorized User step 630, the decision process involves comparing the source address with a list of authorized addresses. If the source address is not included on the authorized checklist, then the decision process 600 is terminated with a Remain Deactivated step 608 that returns the receiving device to a listening state for monitoring subsequent messages. Otherwise, the decision process 600 enters a Wakeup state 634.

The Wakeup state 634 includes both a hardware wakeup operation for applying operating power to the receiving device hardware including activation of peripherals and preparation for software execution and a software wakeup operation for activating the receiving device operating system. Activation of the operating system kernel progresses to an Authentication step 636 in which the operating system kernel prompts for a password. A password conveyed via the network is then compared to a list of authorized passwords in Compare Password with Authorized List step 638. If the password is included in the authorized password list, the system is ready to execute and enters Execute state 626. If the password is not correct, the decision process 600 progresses to a Reattempt password step 642 which returns to the Compare Password with Authorized List step 638. The Reattempt password step 642 counts the number of unsuccessful attempts to supply an authorized password. After a predetermined limited number of reattempts, the decision process 600 enters a Deactivate step 644. In the Deactivate step 644, the receiving device reverts to the deactivated state of a sleep mode. The predetermined limited number of attempts may be a set number or a variable number of attempts. In one embodiment, the number of attempts is set by a random number generator with a set minimum number of attempts so that an unauthorized user is dissuaded from multiple retries of the password.

Following the Deactivate step 644, the decision process 600 proceeds to a Timed Deactivation step 646. The receiving device remains in the deactivated state for a predetermined time, for example 15 minutes, to deter unauthorized users. In some embodiments, the deactivation time is variable or random to prevent unauthorized users for attempting entry at a programmed interval. The usage of a variable time before retry is possible advantageously renders the attempted entry by an unauthorized user highly frustrating. The usage of a variable time before retry is possible in combination with the usage of a variable number of retries to cause deactivation advantageously elevates the frustration of entry for unauthorized users.

Figure 7:
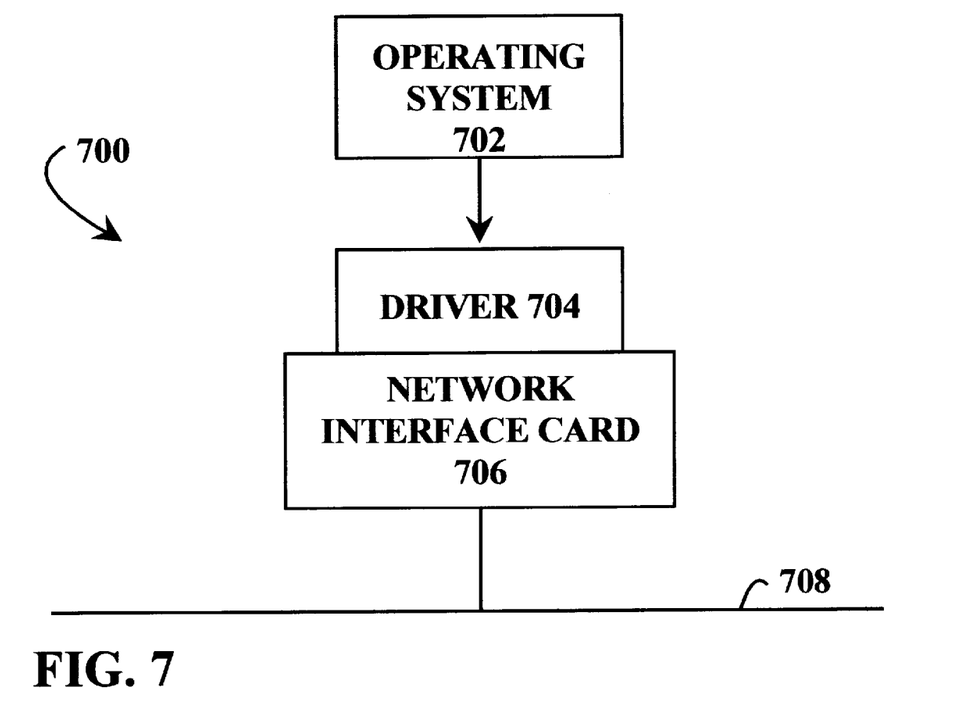
FIG. 7 is a schematic block diagram illustrating an embodiment of a software and network architecture of a network interface controller.

Referring to FIG. 7, a schematic block diagram illustrates an embodiment of a software and network architecture of a network interface controller 700. The network interface controller 700 includes an operating system 702, a driver 704 which is part of the operating system 702, a network interface card 706, and a network wire 708 such as a physical wire in an Ethernet. The network interface card 706 interfaces to the network wire 708 to receive and transmit information. The network interface card 706 is controlled by the operations of the driver 704. The illustrative control program for controlling access of network communications to a receiving device is located in the driver 704.

Figure 8:
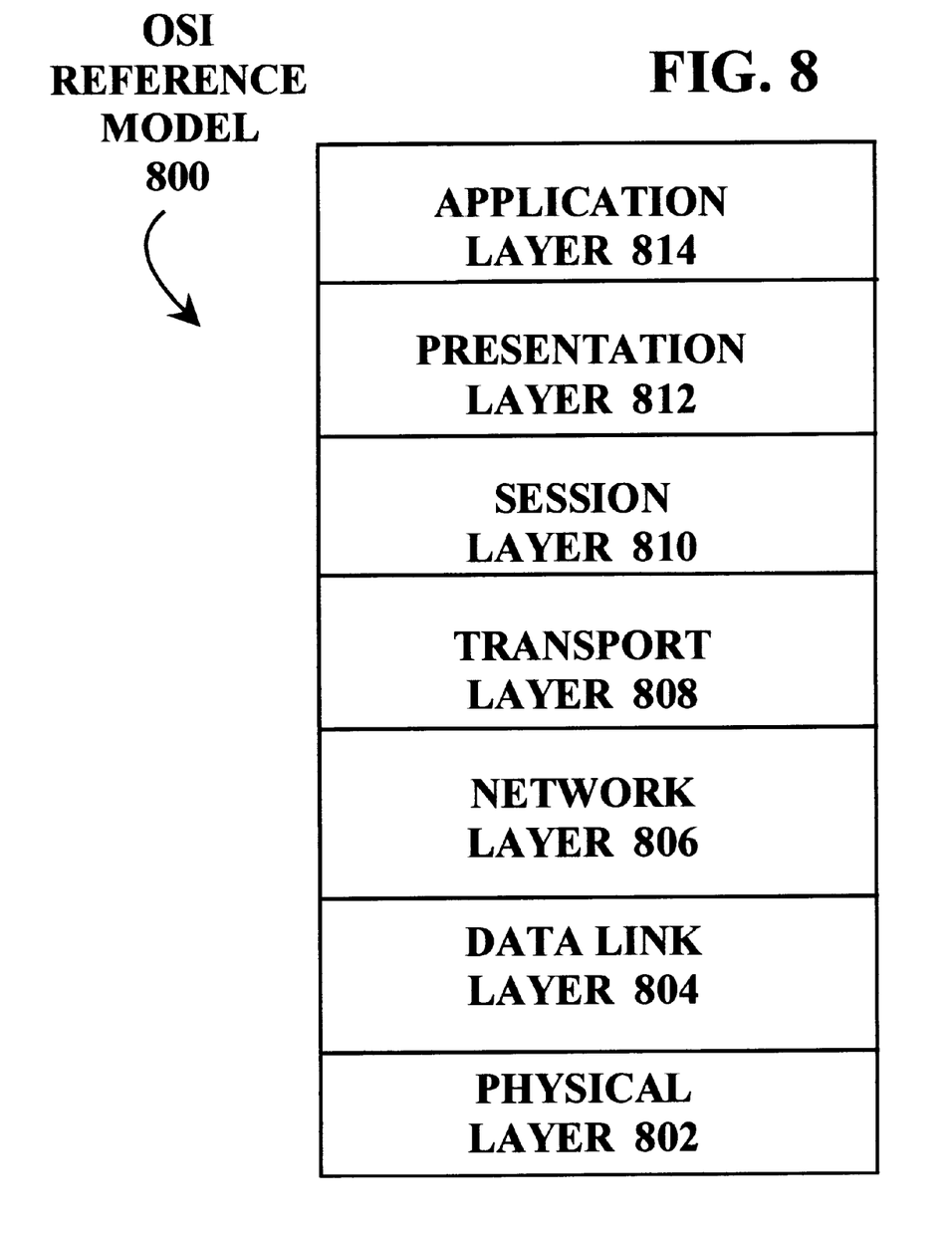
FIG. 8 is a schematic block diagram illustrating the Open Systems Interconnection (OSI) reference model as defined by the International Standards Organization (ISO) and depicts the location of an embodiment of a software and network architecture of a network interface controller within the OSI reference model.

Referring to FIG. 8, a schematic block diagram illustrates the Open Systems Interconnection (OSI) reference model as defined by the International Standards Organization (ISO) and depicts the location of an embodiment of a software and network architecture of a network interface controller within the OSI reference model. The OSI reference model 800 stack defines a physical layer 802, a data link layer 804, a network layer 806, a transport layer 808, a session layer 810, a presentation layer 812, and an application layer 814. In the OSI stack 800, the driver 704 operates between the boundary of the data link layer 804 and the network layer 806.

Figure 9:
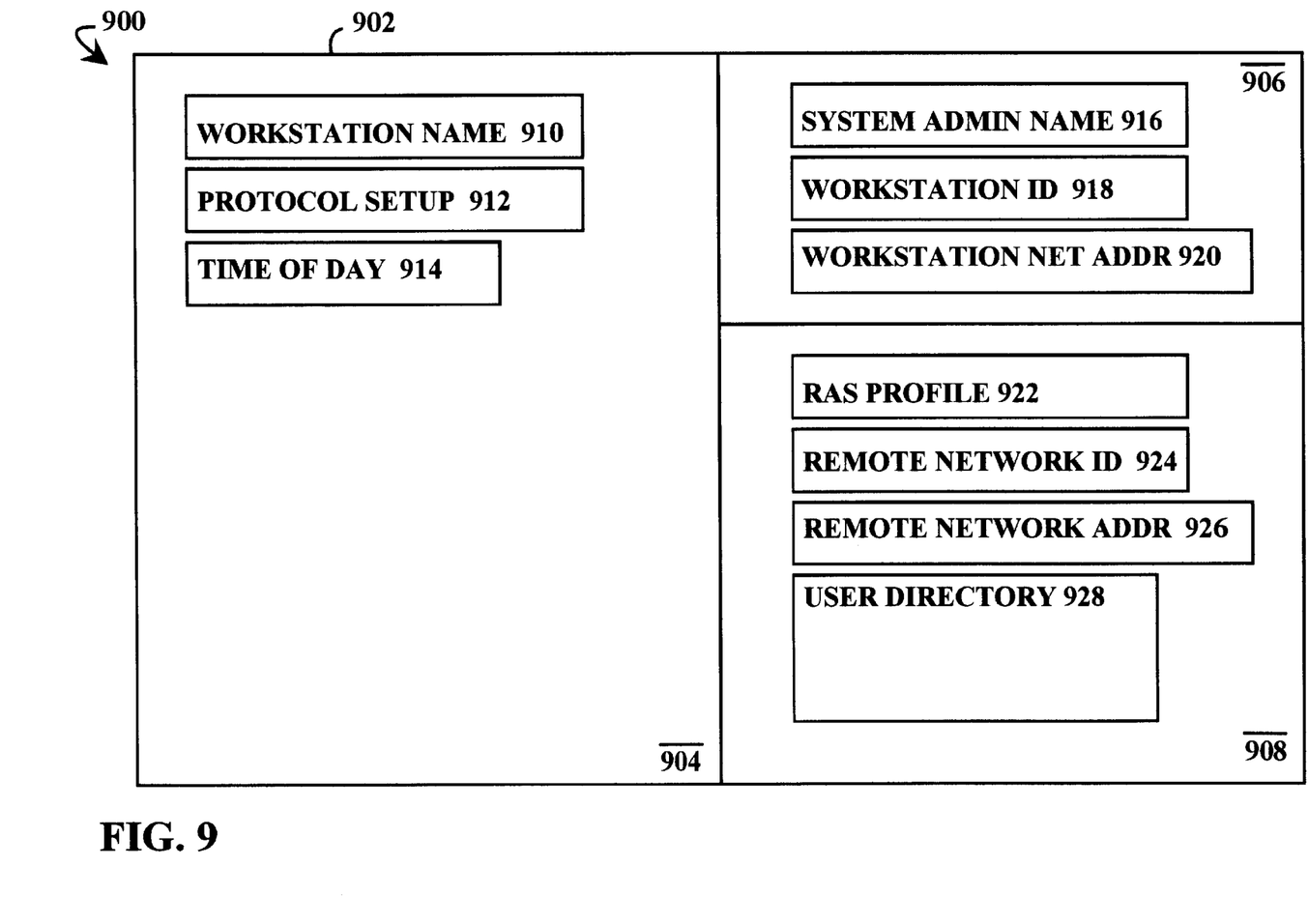
FIG. 9 is a schematic pictorial diagram illustrating an embodiment of a screen display of an applet.

Referring to FIG. 9, a schematic pictorial diagram illustrates an embodiment of a control panel graphic screen display 902 of an applet 900. In an illustrative embodiment, the applet 900 is a 32-bit Windows program which generates a screen display 902. The applet 900 includes a user-defined portion 904, a system administration portion 906, and a remote access portion 908. The user-defined portion 904 identifies a workstation and the protocol support of the workstation by designating a workstation name 910 of the workstation accessed using the applet 900, a protocol setup 912, and a display of the time of day 914. The protocol setup 912 identifies the protocol support of the workstation, for example the designation of Internet Protocol (IP) and Internet Protocol Exchange (IPX) support. The applet 900 also designates the IP address for informational purposes. The time of day 914 selection optionally allows the specification of accessibility times 24 hours a day and seven days a week. The applet 900 displays the time of day 914 to designate access of the workstation on a selected day for a selected range of time.

The system administration portion 906 designates a system administration name 916, a workstation identifier 918, and a workstation network address 920. The system administration name 916 is user-defined and used to designate the system administrator that is authorized for access to the workstation and identifies the applicable workstation according to workstation identifier 918 and workstation network address 920.

The remote access portion 908 designates a remote access support (RAS) profile 922, a remote network identifier 924, a remote network address 926, and a remote access directory 928. The remote access directory 928 is a predefined directory created and configured for remote access by a user. Access to the remote access directory 928 is protected using the method described with reference to FIGS. 6A and 6B including verification of user ID, network ID, time of access, rejection of incorrect passwords and the like.

The applet 900 is defined to facilitate setup of the network and devices connected to the network. The applet 900 is a single-screen applet 900 and system setup is achieved by filling in sections of the applet screen display 902 thereby setting data structures controlling aspects of message communication. Typically, the applet 900 is defined in accordance with Windows 95 and Windows NT security mechanisms and Application Program Interfaces (APIs). Similar functionality may be implemented in other operating systems including UNIX and PDA operating systems. The security features of the network interface controller are therefore facilitated and augmented by the security mechanisms of the Windows operating systems so that a small amount of applications code achieves a substantial functionality by exploiting features of the installed operating system and drivers.

While the invention has been described with reference to various embodiments, it will be understood that these embodiments are illustrative and that the scope of the invention is not limited to them. Many variations, modifications, additions and improvements of the embodiments described are possible. The illustrative embodiment includes a the network interface controller of a network interface that performs an analysis to determine whether a receiving device accepts a particular message. In alternative embodiments, a simple circuit may be used to activate a processor within the receiving device when a message is detected. The processor then performs an analysis to determine whether the message is to be serviced. If the message is accepted, the processor continues to perform operations requested by the message. If the message is not accepted, the processor returns to an inactive state.

What is claimed is:

1. A network interface for connecting a device to a network, the device coupled to a power supply supplying operating power to the device, the network interface comprising:

a network interface controller having an input terminal coupled to the network for receiving messages in a generic format from one or more transmitting devices connected to the network and having a control signal output terminal coupled to the device for communicating a device activation signal to the device, the network interface controller including:

a control logic operative for determining whether the received message in a generic format includes message conditions that are authorized message conditions and generating the activation signal to the device based on the determination, wherein:

the message conditions include an authorized message time and date a power source coupled to the network interface for supplying operating power to the network interface independently from the power supply supplying operating power to the device; and the device having a designated device address, the received message in a generic format designating a target device address, and the network interface controller including a control logic operative for awaiting receipt of a message from a transmitting device, reading a target device address included within a message in response to receipt of the message, determining whether the target device address matches the designated device address, and generating the activation signal to the device based on the determination.

2. A network interface according to claim 1, wherein:
the message conditions include a message type condition.

3. A network interface according to claim 1, wherein:
the message conditions include a frame type condition.

4. A network interface according to claim 1 wherein:
the message conditions include a specification of the source address of a transmitting device.

5. A network interface according to claim 1, wherein the network interface controller includes:

a control logic including:

a first control logic operative for determining whether the received message in a generic format includes a unique Ethernet address that identifies the designated target device address in compliance with a standard specification; and a second control logic operative for determining whether the received message in a generic format includes message conditions that are authorized message conditions; and a third control logic operative for generating the activation signal to the device based on the determination of the Ethernet address and the authorized message conditions.

6. A network interface according to claim 5, wherein:
the network interface controller includes a decision matrix for determining whether the received message in a generic format includes message conditions that are authorized message conditions.

7. A network interface according to claim 5, wherein:
the network interface controller is a processor; and
the first control logic operative for determining whether the received message in a generic format includes a unique Ethernet address that identifies the designated target device address in compliance with the standard specification, the second control logic operative for determining whether the received message in a generic format includes message conditions that are authorized message conditions, and the third control logic operative for generating the activation signal to the device based on the determination of the Ethernet address and the authorized message conditions are executable software routines.

8. A network interface according to claim 1, wherein:
the network interface controller further includes:
means for accessing the destination device identifier from the message;
means for classifying the message according to message type; and
means for determining whether to activate the destination device or leave the destination device in the low-power state based on a set of activation rules relating to the destination device identifier and the message type.

9. A network interface according to claim 1, wherein:
the message conditions include authentication using a password.

10. A network interface according to claim 1, wherein the network interface controller includes:
a control logic operative for determining whether a submitted password is included in a set of authorized passwords, prompting a requester for a new submitted password when the submitted password is not included in the set of authorized passwords, counting a number of submitted passwords that are not included in the set of authorized passwords, and deactivating the device if the number of not included passwords is greater than a preset limit.

11. A network computer system that is connectable to a network, the network computer system comprising:

a computer system coupled to a power supply switchably supplying operating power to the computer system under control of an activation switch; and a network interface for connecting the computer system to the network, the network interface having an input terminal coupled to the network for receiving messages in a generic format from one or more transmitting devices connected to the network and having a control signal output terminal coupled to the computer system for communicating a computer system activation signal to the computer system, the network interface including a control logic operative for determining whether the received message in a generic format includes message conditions that are authorized message conditions and generating the activation signal to the computer system based on the determination, the message conditions including an authorized message time and date;

a power source coupled to the network interface and supplying operating power to the network interface independently from the power supply supplying operating power to the computer system; and the computer system having a designated device address, the received message in a generic format designating a target device address, and the network interface including a control logic operative for awaiting receipt of a message from a transmitting device, reading a target device address included within a message in response to receipt of the message, determining whether the target device address matches the designated device address, and generating the activation signal to the computer system based on the determination.

12. A network computer system according to claim 11, wherein:
the message conditions include a message type condition.

13. A network computer system according to claim 11, wherein:
the message conditions include a frame type condition.

14. A network computer system according to claim 11, wherein:
the message conditions include a specification of the source address of a transmitting device.

15. A network computer system according to claim 11, wherein the network interface includes:
a control logic including:
a first control logic operative for determining whether the received message in a generic format includes a unique Ethernet address that identifies the designated target device address in compliance with a standard specification;
a second control logic operative for determining whether the received message in a generic format includes message conditions that are authorized message conditions; and
a third control logic operative for generating the activation signal to the computer system based on the determination of the Ethernet address and the authorized message conditions.

16. A network computer system according to claim 15, wherein:
the network interface includes a decision matrix for determining whether the received message in a generic format includes message conditions that are authorized message conditions.

17. A network computer system according to claim 15, wherein:
the network interface includes a processor;
the first control logic operative for determining whether the received message is in a generic format includes a unique Ethernet address that identifies whether the designated target device address complies with a standard specification,
the second control logic operative for determining whether the received message in a generic format includes message conditions that are authorized message conditions, and
the third control logic operative for generating the activation signal to the computer system based on the determination of the Ethernet address and the authorized message conditions are executable software routines.

18. A network computer system according to claim 11, wherein:
the network interface controller further includes:
means for accessing the destination device identifier from the message;
means for classifying the message according to message type; and
means for determining whether to activate the destination device or leave the destination device in the low-power state based on a set of activation rules relating to the destination device identifier and the message type.

19. A network computer system according to claim 11, wherein:

the message conditions include authentication using a password.

20. A network computer system according to claim 11, wherein the network interface controller includes:
a control logic operative for determining whether a submitted password is included in a set of authorized passwords, prompting a requester for a new submitted password when the submitted password is not included in the set of authorized passwords, counting a number of submitted passwords that are not included in the set of authorized passwords, and deactivating the computer system if the number of not included passwords is greater than a preset limit.

21. A method of activating a deactivated computer system connected to a network via a network interface, the method comprising:
previously authorizing message conditions for activating the computer system, the message conditions including an authorized message time and date;
assigning a designated device address to the computer system;
supplying operating power to the network interface independently from a supply of operating power to the computer system;
awaiting receipt of a message from a transmitting device;
receiving a message in a generic format from the transmitting device connected to the network, the received message including a designation of a target device address;
reading the target device address included within the message in response to receipt of the message;
determining whether the designated target device address matches the designated device address;
determining whether the received message in a generic format includes message conditions that are previously authorized message conditions; and
selectively activating the computer system based on the determination of whether the designated target device address matches the designated device address in combination with the determination of whether the received message in a generic format includes message conditions that are previously authorized message conditions.

22. A method according to claim 21, wherein:
the message conditions include a message type condition.

23. A method according to claim 21, wherein:
the message conditions include a frame type condition.

24. A method according to claim 21, wherein:
the message conditions include a specification of the source address of a transmitting device.

25. A method according to claim 21, further comprising:
determining whether the received message in a generic format includes a unique Ethernet address that identifies the designated target device address in compliance with a standard specification; and
determining whether the received message in a generic format includes message conditions that are authorized message conditions; and
selectively activating the computer system based on the determination of the Ethernet address and the authorized message conditions.

26. A method according to claim 25, wherein:
the method of determining whether the received message in a generic format includes message conditions that are authorized message conditions includes processing a decision matrix.

27. A method according to claim 25, wherein:

the method is executed on a processor by a control logic; and the control logic operative for determining whether the received message in a generic format includes a unique Ethernet address that identifies the designated target device address in compliance with a standard specification, the control logic operative for determining whether the received message in a generic format includes message conditions that are authorized message conditions, and the control logic operative for generating the activation signal to the device based on the determination of the Ethernet address and the authorized message conditions are executable software routines.

28. A method according to claim 21, further comprising:

accessing the destination device identifier from the message;

classifying the message according to message type; and determining whether to activate the destination device or leave the destination device in the low-power state based on a set of activation rules relating to the destination device identifier and the message type.

29. A method according to claim 21, wherein:

the message conditions include authentication using a password.

30. A method according to claim 21, further comprising:

determining whether a submitted password is included in a set of authorized passwords;

prompting a requester for a new submitted password when the submitted password is not included in the set of authorized passwords;

counting a number of submitted passwords that are not included in the set of authorized passwords; and deactivating the computer system if the number of not included passwords is greater than a preset limit.

* * * * *